June 29, 1926.

J. P. DONOVAN

EGG OPENING DEVICE

Filed Feb. 7, 1925

1,590,813

Inventor
J. P. Donovan.

By

Attorney

Patented June 29, 1926.

1,590,813

UNITED STATES PATENT OFFICE.

JOSEPH PAUL DONOVAN, OF THETFORD MINES, QUEBEC, CANADA.

EGG-OPENING DEVICE.

Application filed February 7, 1925. Serial No. 7,584.

This invention relates to improvements in kitchen utensils, and is more particularly adapted to a device for breaking the shell of an egg.

One of the important objects of the present invention is to provide a device of the above mentioned character, wherein a pair of complementary sections cooperate to receive and support an egg, a pair of complementary cutting knives being associated with the sections for breaking the shell of an egg, means being provided for separating the sections, whereby the broken portions of the egg shell will be separated to permit the eggs to be removed therefrom.

A further object is to provide an egg opening device of the above mentioned character, wherein the cutting knives thereof provide a means for preventing any particles of the broken shell from falling into the receptacle, together with the contents of the shell.

A still further object is to provide an egg opening device of the above mentioned character, which is simple in construction.

Other objects and advantages of this invention will become apparent during the course of the following detailed description, taken in connection with the accompanying drawing.

In the drawing, forming a part of this specification and in which like reference characters indicate corresponding parts throughout the several views.

In the accompanying drawing, wherein for the purpose of illustration is shown the preferred embodiment of my invention, the numeral 1 designates generally the holder, the same comprising the complementary sections 2 and 3, each of which includes a curved plate. The complementary sections are hingedly connected together, at their respective ends, as illustrated at 4. The inner adjacent longitudinal edges of the curved plates comprising the complementary sections are disposed upwardly in abutting relation, as illustrated at 5 and 6 respectively, the upper edges of the upstanding portions 5 and 6 providing complementary cutting edges 7 and 8 respectively, thus forming a pair of cutting knives or blades at the inner longitudinal edges of the complementary sections.

Figure 1:
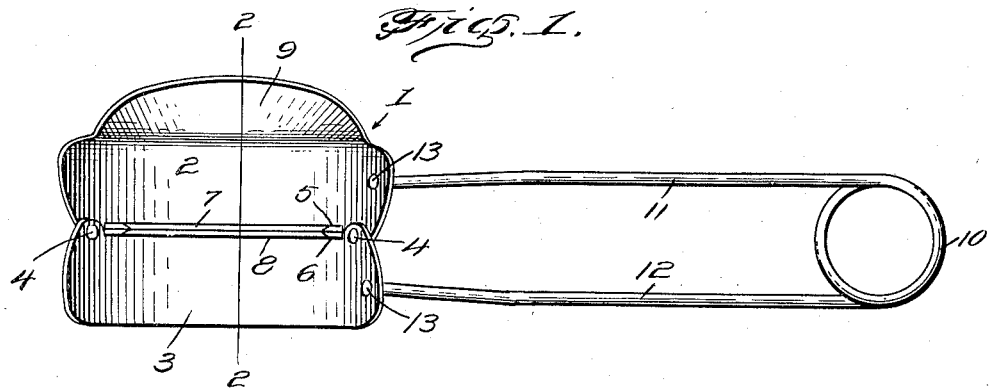
Figure 1 is a top plan view of the egg opening device embodying my invention.
Figure 2:
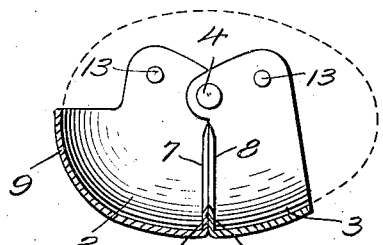
Figure 2 is a sectional view, taken approximately on the line 2—2 of Figure 1.

The section 2 is provided at its outer longitudinal side edge with the upstanding curved portion 9, the purpose of which is to prevent the displacement of an egg, when the latter is placed in the holder, transversely of the complementary sections as is clearly illustrated in Figure 2.

The handle associated with the holder is formed of a single strand of wire, the same being coiled intermediate its ends, as is illustrated at 10. The free ends of the arms 11 and 12, which extend in parallel relation from the coiled portion 10, are fastened to the forward ends of the complementary sections 2 and 3 respectively, at a point above the pivotal connection 4, as is illustrated at 13.

Figure 3:
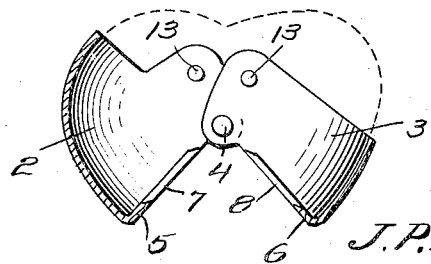
Figure 3 is a similar view, showing the complementary sections in an open position, and the manner in which the broken portions of an egg shell are separated from each other.

In use, an egg is placed in the holder 1, in the manner as shown in Figure 2, and the cutting edges 7 and 8 of the cooperating knives will break the egg shell into two halves. By gripping the arms 11 and 12 of the handle and squeezing the same, the complementary sections will be caused to swing to an open position on their pivots 4, simultaneously causing the halves of the egg shell, which have been broken to be opened or separated, whereby the contents of the egg shell may be discharged therefrom. The upstanding portions 5 and 6 which form the cutting blades will provide a means whereby any broken particles of the shell will be prevented from dropping out of the holder, together with the contents of the egg shell, as is obvious from the construction illustrated in Figure 3.

The provision of a device of the above mentioned character will enable persons to open eggs more efficiently, and furthermore will save considerable time and labor. The simplicity with which my device is constructed enables the same to be manufactured at a very low cost, and will, at all times, be strong and durable, as well as positive and efficient for carrying out the purposes for which the same is designated.

While I have shown the preferred embodiment of my invention it is to be understood that various changes in the size, shape and arrangement of parts may be resorted to, without departing from the spirit of the invention and the scope of the appended claim.

Having thus described my invention, what is claimed is:

An egg opening device of the class described comprising a holder, the latter including a pair of longitudinally curved complementary sections, said sections being pivotally secured together at their respective ends, one of the sections having an upstanding portion at the outer side thereof, the inner adjacent edges of the complementary sections being disposed upwardly in abutting relation, the upper edges of said upwardly disposed portions being sharpened to provide a pair of complementary cutting knives for breaking and penetrating the shell of an egg placed in said holder, the upstanding portions further cooperating to hold the broken halves or sections of the egg in the respective curved sections and a handle to manipulate the parts.

In testimony whereof I affix my signature.

JOSEPH PAUL DONOVAN.